United States Patent [19]

Batchelder et al.

[11] Patent Number: 5,312,224
[45] Date of Patent: May 17, 1994

[54] CONICAL LOGARITHMIC SPIRAL VISCOSITY PUMP

[75] Inventors: John S. Batchelder, Somers; Shawn A. Hall, Pleasantville; Robert R. Jackson, Millbrook, all of N.Y.

[73] Assignee: International Business Machines Corporation, Armonk, N.Y.

[21] Appl. No.: 30,984

[22] Filed: Mar. 12, 1993

[51] Int. Cl.$^5$ .......................... F04D 3/00; B23P 15/00
[52] U.S. Cl. .......................................... 415/73; 415/90; 415/72; 416/177; 29/888.02; 29/888.025
[58] Field of Search ...................... 415/71, 72, 73, 90; 416/176, 177; 29/888, 888.02, 888.025

[56] References Cited

U.S. PATENT DOCUMENTS

| | | |
|---|---|---|
| 1,448,079 | 3/1923 | Noeggerath . |
| 1,448,080 | 3/1923 | Noeggerath . |
| 1,810,083 | 6/1931 | Norinder ............................ 415/73 |
| 3,298,314 | 1/1967 | Kopczynski ......................... 415/72 |
| 3,300,811 | 1/1967 | Berger ................................ 415/73 |
| 3,572,646 | 3/1971 | Kocher ............................... 415/72 |
| 3,697,190 | 10/1972 | Haentjens ........................... 415/73 |
| 3,762,313 | 10/1973 | Schott, Jr. . |
| 3,829,270 | 8/1974 | DeBonth et al. .................... 415/90 |
| 4,025,274 | 5/1977 | Uemura et al. . |
| 4,047,705 | 9/1977 | Hanslik . |
| 4,242,039 | 12/1980 | Villard et al. ....................... 415/140 |
| 4,304,539 | 12/1981 | Hagiwara et al. . |
| 4,329,313 | 5/1982 | Miller et al. . |
| 4,357,291 | 11/1982 | Miller et al. . |
| 4,632,795 | 12/1986 | Huber et al. . |
| 4,749,347 | 6/1988 | Valavaara . |
| 4,787,826 | 11/1988 | Schnell . |
| 5,011,368 | 4/1991 | Frindel et al. ....................... 415/90 |
| 5,153,008 | 10/1992 | Koch . |

FOREIGN PATENT DOCUMENTS 2478222 8/1981 France .

OTHER PUBLICATIONS

"Spiral Groove Bearings" by E. A. Muijderman, Philips Technical Library, Springer-Verlag New York Inc., 1966, pp. 1-23.

Primary Examiner—Edward K. Look
Assistant Examiner—James A. Larson
Attorney, Agent, or Firm—Perman & Green

[57] ABSTRACT

A rotary viscosity pump is provided that has a housing and an impeller. The housing has a conical chamber with an outlet at a narrow end of the chamber. The impeller has a conical section with a logarithmic spiral groove along its exterior. The spacing between the housing and the impeller can have either a constant gap or a gap that decreases along the length of the impeller. The depth of the groove can be constant, increase, or decrease in depth along the length of the impeller.

20 Claims, 11 Drawing Sheets

CONICAL LOGARITHMIC SPIRAL VISCOSITY PUMP

BACKGROUND OF THE INVENTION

1. Field of the Invention

The present invention relates to pumps and, more particularly, to a rotary viscosity pump.

2. Prior Art

U.S. Pat. No. 1,448,079 to Noeggerath discloses a viscosity pump with a rotary body having spiral grooves with both constant and varying depth. U.S. Pat. No. 1,448,080 to Noeggerath discloses a pumping body for viscosity pumps with curved pumping grooves. U.S. Pat. No. 3,762,313 to Schott, Jr. and French patent 2,478,222 disclose feeding screws with helical flights. U.S. Pat. No. 4,357,291 to Miller et al. discloses a screw with a radius of the screw root that changes along the length of the screw. U.S. Pat. No. 4,047,705 to Hanslik discloses a pair of axially tapered screws.

Viscosity pumps generally include a cylindrical rod turning inside of a fitted sleeve that causes material to move along the interface propelled by the shear between the sleeve and the surface of the rod. This type of pump is standardly used for high viscosity materials such as crude oil and plastics for injection molds. However, viscosity pumps include problems of low efficiency (requiring large motors), large size (none are currently available less than a foot long), and large compressed volumes which leads to poor time response.

There are no pump technologies today that combine the following characteristics: 1) small size (less than 2 cubic inches), 2) high temperature compatibility (450 degrees F.), 3) fast time response (less than 0.03 seconds to full pressure), 4) compatible with a wide range of viscosities (10 to 100,000 centipoise), and 5) low pressure variations during operation (less than 0.5% rms).

SUMMARY OF THE INVENTION

In accordance with one embodiment of the present invention, a viscosity pump is provided comprising a housing and an impeller. The housing has a pump chamber and an outlet. The chamber has a section with a general conical shape. The outlet is located at the narrow end of the chamber section. The impeller is rotatably located in the chamber and has a general conical section with at least one logarithmic spiral groove along an exterior of the conical section.

In accordance with another embodiment of the present invention, a rotary fluid pump is provided comprising a pump housing and an impeller. The pump housing has an inlet, an outlet, and an impeller chamber therebetween. The impeller chamber includes a narrowing section with a narrow end located proximate the outlet. The impeller is rotatably mounted in the impeller chamber and has a portion located in and substantially similarly shaped to the narrowing section except including a groove along its exterior having an approximate logarithmic spiral. The impeller has ridges along its exterior with a substantially constant gap between the ridges and the housing.

In accordance with another embodiment of the present invention, a rotary fluid pump is provided comprising a pump housing and an impeller. The pump housing has an inlet, and outlet, and an impeller chamber therebetween. The impeller chamber includes a narrowing section with a narrow end located proximate the outlet. The impeller is rotatably mounted in the impeller chamber and has a portion located in and substantially similarly shaped to the narrowing section except including a groove along its exterior having an approximate logarithmic spiral. The impeller has ridges along its exterior with a gap that varies between the ridges and the housing along the length of the impeller.

BRIEF DESCRIPTION OF THE DRAWINGS

The foregoing aspects and other features of the invention are explained in the following description, taken in connection with the accompanying drawings, wherein.

DETAILED DESCRIPTION OF THE INVENTION

Figure 1:
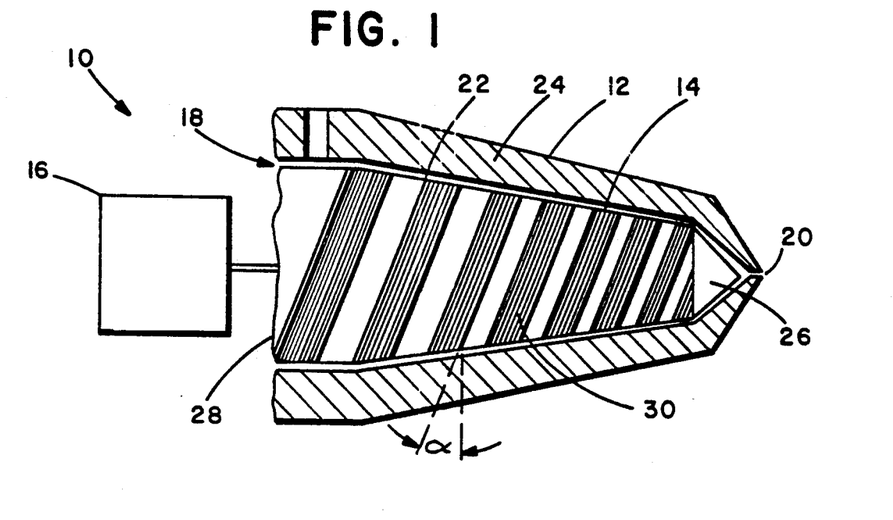
FIG. 1 is a schematic sectional view of a pump incorporating features of the present invention.

Referring to FIG. 1, there is shown a schematic sectional view of a pump 10 incorporating features of the present invention. Although the present invention will be described with reference to the embodiments shown in the drawings, it should be understood that the present invention may be embodied in many alternative embodiments. It should also be understood that any suitable size, shape or type of members or materials could be used as further understood from the description below.

The pump 10, in the embodiment shown, is a rotary viscosity fluid pump comprising a housing 12, an impeller 14, and a drive 16. The motor or drive 16 can be either provided separately from the housing 12 and impeller 14, or can be incorporated in an assembly with the housing 12 and impeller 14. The housing 12 includes an inlet 18, an outlet 20, and a pump chamber 22 therebetween. The pump chamber 22 has a conically shaped inner surface 24. The inlet 18 is located proximate the large end of the conically shaped surface 24. The outlet 20 is located proximate the narrow end of the conically shaped surface 24. In the embodiment shown, the inner surface 24 of the housing 12 in the chamber 22 is smooth. The conically shaped surface 24 of the chamber 22 has a cone half angle t of about 6°. However, the cone half angle t could be between 0.5° and 90°.

Figure 1A:
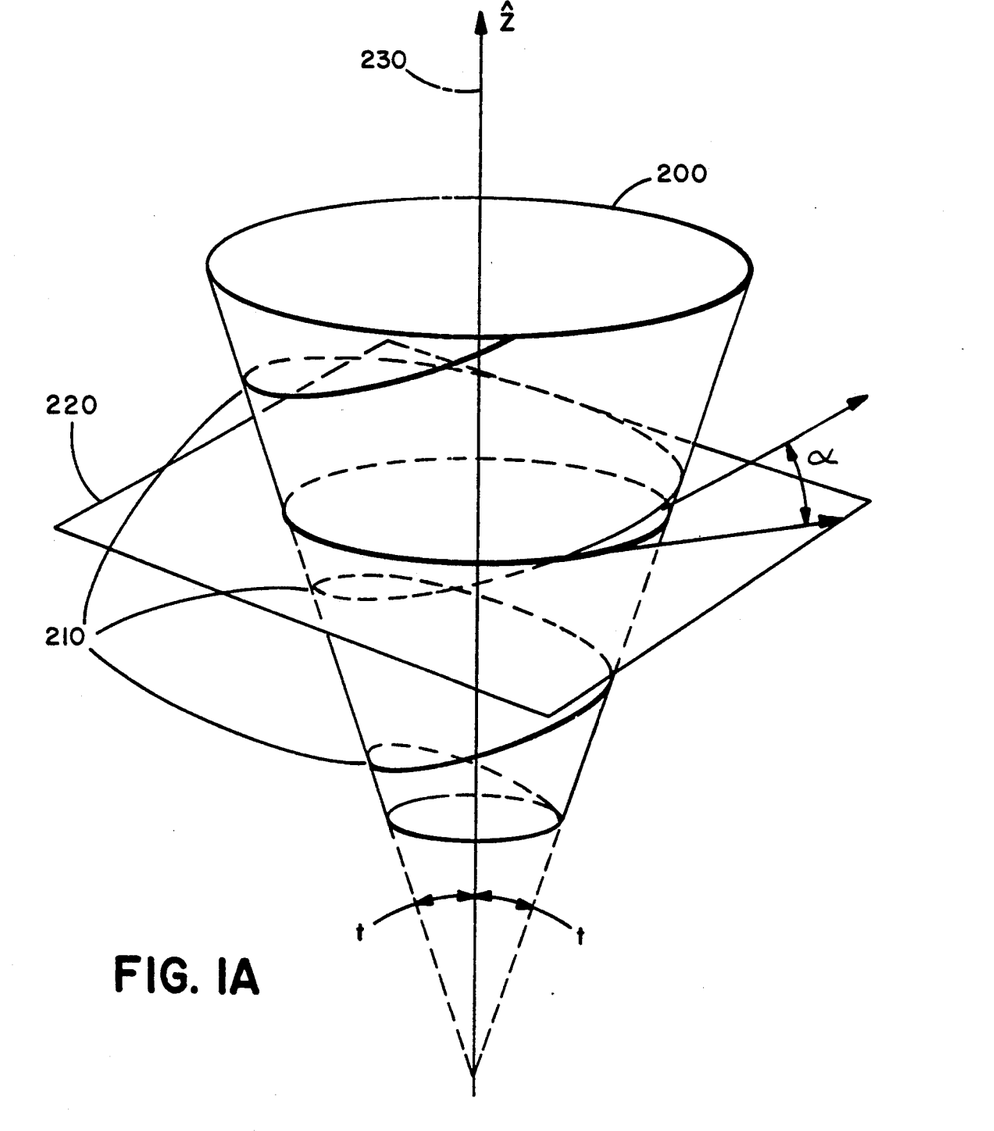
FIG. 1a is a diagram of a cone used to describe a logarithmic spiral.
Figure 2:
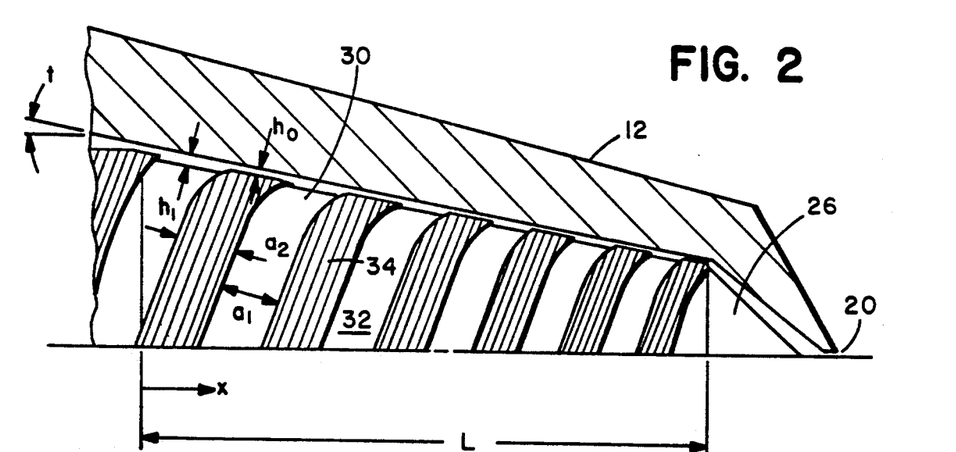
FIG. 2 is an enlarged partial view of the pump shown in FIG. 1.

The impeller 14 generally comprises a front 26, a rear 28, and a generally conical section 30 therebetween. The impeller 14 is positioned into the pump chamber 22 and has its rear end 28 connected to the drive 16. The drive 16 is adapted to axially rotate the impeller 14 inside the chamber 22. The front 26 of the impeller 14 has a substantially smooth cone shaped tip located at the outlet 20. The generally conical section 30 has spiral grooves 32 and ridges 34 between the front 26 and rear 28. The grooves 32 and ridges 34 have a logarithmic spiral along the exterior of the conical section 30; i.e.: a curve line somewhat analogous to the common logarithmic curve. It intersects all its radiants at the same angle, and the tangent of this angle is the modulus of the system of logarithms which the particular spirals represent. The sidewalls between the spiral grooves 32 and ridges 34 along the exterior of the conical section 30 approximate a logarithmic spiral. As shown in FIG. 1a, for a cone 200 with a half angle t, a logarithmic spiral 210 on the surface of the cone is created by a line which maintains a constant angle $\alpha$ with respect to planes 220 normal to the axis 230 of the cone 200. In cylindrical coordinates, points on the spiral are $(\theta, r(\theta), z(\theta))$:

$$r(\theta) = R \exp(-\theta \tan(\alpha) \sin(t)) \quad (1)$$

$$z(\theta) = (R - r(\theta))/\tan(t) \quad (2)$$

where R is the radius of the spiral at $\theta = 0$. It is called a logarithmic spiral because the angular position along the spiral is given by the logarithm of the radius:

$$\theta(r) = \ln(r)\left(-\frac{1}{\tan(\alpha)\sin(t)}\right) + \ln(R)\left(\frac{1}{\tan(\alpha)\sin(t)}\right) \quad (3)$$

(In a normal screw thread or helical spiral, the angular position $\theta$ is independent of the radius.) In the embodiment shown, the width of the grooves 32 decreases along the length of the conical section 30 from the rear 28 to the front 26. However, the depth of the grooves 32 remains constant along the length. The bottom of the grooves 32 are spaced from the interior wall of the housing 12 by a spacing $h_1$ which is preferably about 0.006 inch for the impeller 14 having a rear end radius R of about 0.125 inch. The ridges 34 are spaced from the interior wall of the housing 12 by a spacing $h_0$ which is preferably about 0.002 inch. The ratio H and $h_0$ to $h_1$ is preferably about 0.05 to about 0.95. The groove angle $\alpha$ is preferably about 5° to about 90°. The ratio $\gamma$ of ridge width $a_2$ to groove width $a_1$ is preferably about 0.1 to about 3.

Figure 3:
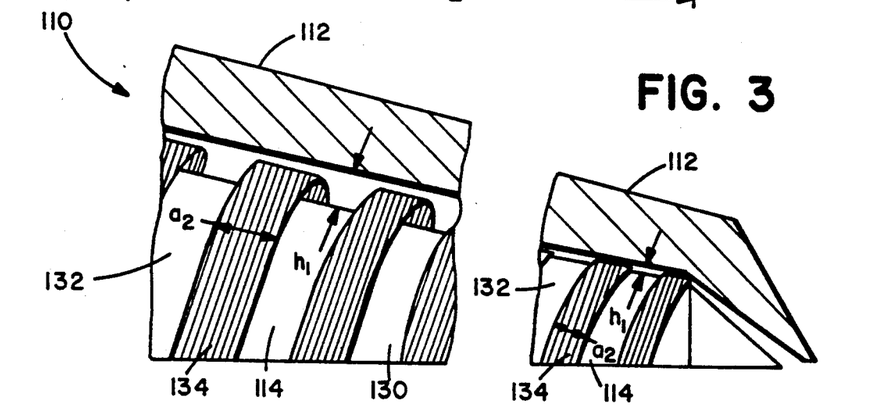
FIG. 3 is an enlarged partial view, similar to FIG. 2, of an alternate embodiment of the present invention.

The pump 10, due to the logarithmically spiral grooves 32, is much improved from viscosity pumps of the prior art. The pump 10 and pumps 110 and 211 (see FIGS. 3 and 4) are, therefore, new types of viscosity pumps; conical logarithmic spiral viscosity pumps with features and advantages as further described below. The pump 10 can be provided with a small size (less than two cubic inches), can operate in high temperatures (such as 450° F.), has a fast response time (less than 0.03 seconds to full pressure), is compatible with a wide range of viscosities (such as 10 to 10,000 centipoise), has low pressure variations during operation (such as less than 0.5% rms). Unlike viscosity pumps known in the prior art, the pump 10 has relatively high efficiency. Therefore, a large pump motor or drive is not required. In addition, the pump 10 can have a relatively small size. Prior art viscosity pumps have large compressed volumes (due to their relatively large size) which leads to poor time response. The pump 10, due to its relatively small size, has relatively small compressed volumes and, thus, good time response.

The primary reasons that small viscosity pumps have not been developed for injection molding applications are that most molds require the larger volume flow rate than a small pump can provide, and most plastic injection pumps are designed to convert powder or pellet material into liquid, which requires a large size to achieve homogeneity as discussed in U.S. Pat. No. 5,153,008.

MATHEMATICAL ANALYSIS

It is one of the purposes of this invention to provide a design methodology by which the mechanical dimensions of the pump components and the characteristic of the fluid material to be pumped can be mathematically combined to predict the performance of the design, thereby allowing an optimization of the design to be done before a mechanical implementation is created.

Figure 4:
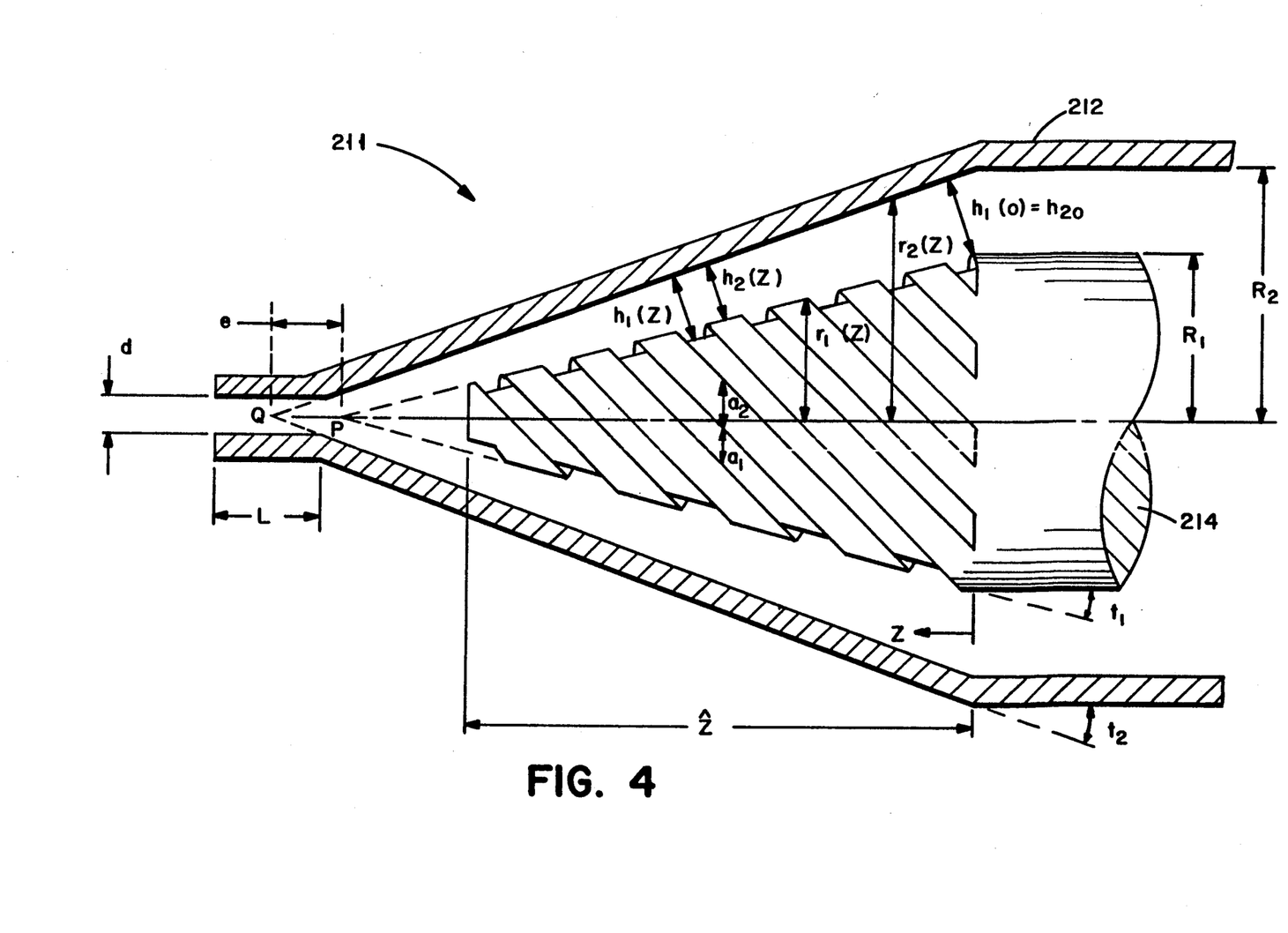
FIG. 4 is a schematic view of a pump for mathematical analysis.
Figure 5A:
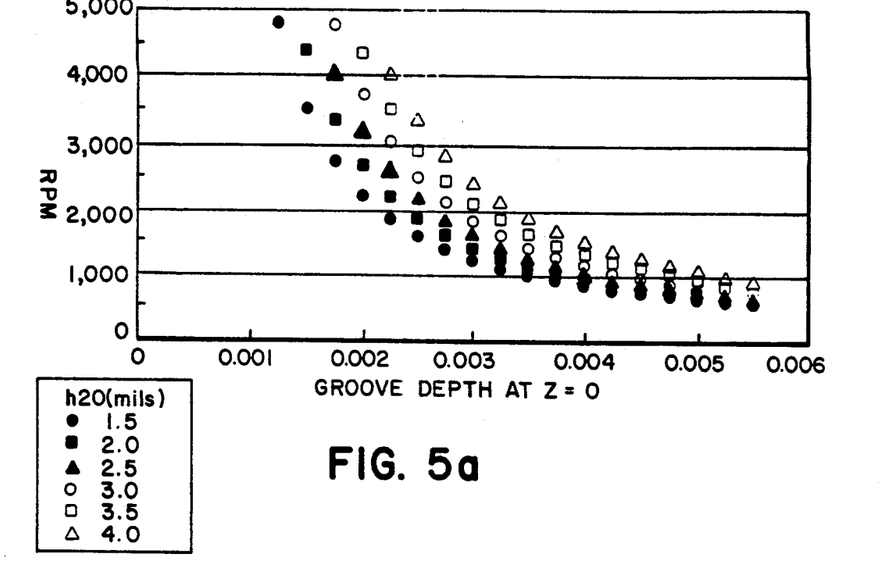
FIG. 5a is a graph of theoretical results for RPM vs. groove depth and shroud-cone clearance with other geometry and flow parameters fixed.
Figure 5B:
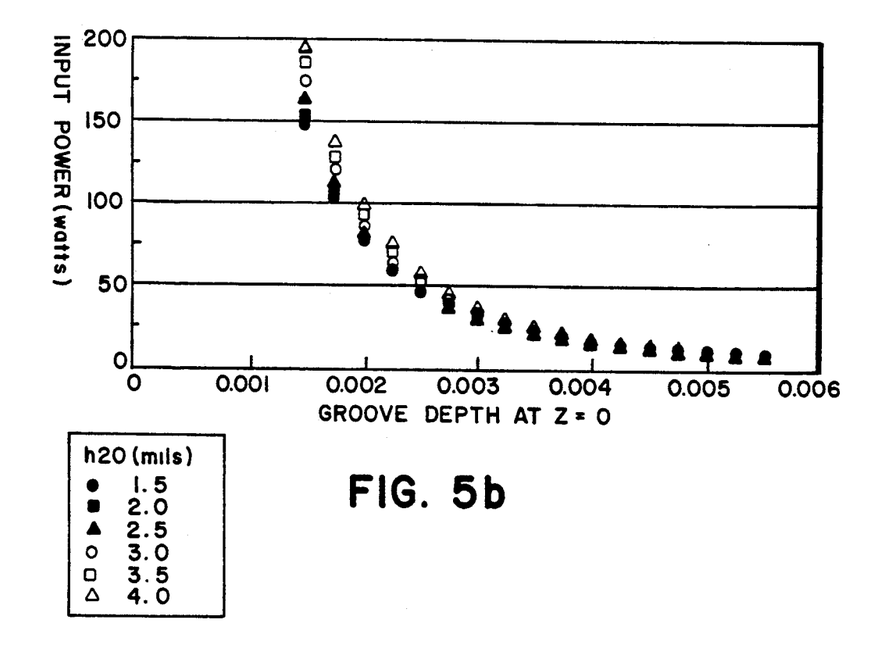
FIG. 5b is a graph of theoretical results for input power vs. groove depth and shroud-cone clearance with other geometry and flow parameters fixed.
Figure 6A:
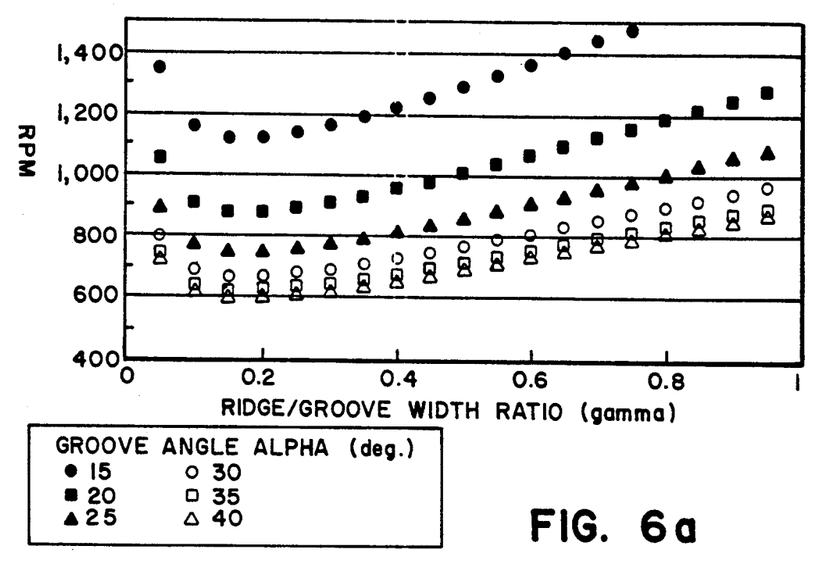
FIG. 6a is a graph of theoretical results for RPM vs. groove angle and ridge/groove width radio with other geometry and flow parameters fixed.
Figure 6B:
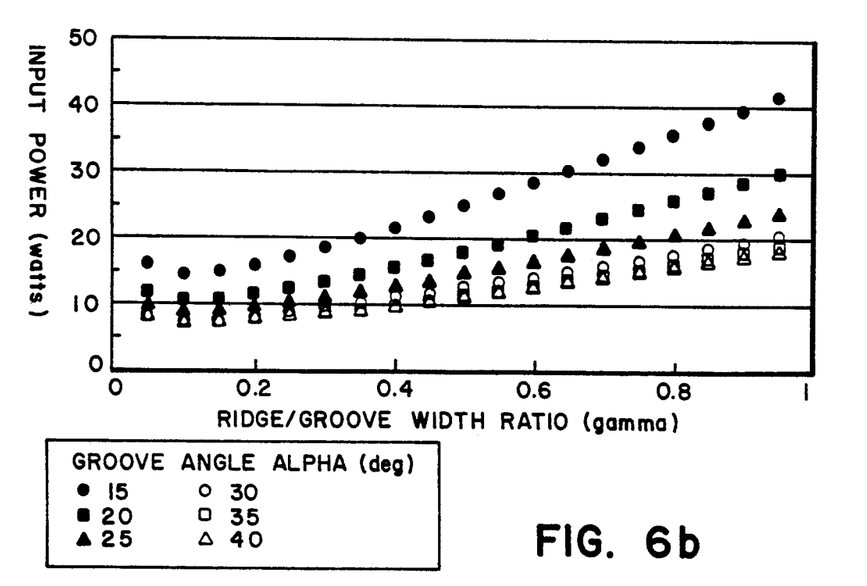
FIG. 6b is a graph of theoretical results for input power vs. groove angle and ridge/groove width ratio with other geometry and flow parameters fixed.

The design methodology will now be described with reference to FIG. 4. FIG. 4 shows a schematic view of a pump 211 with an impeller cone 214 and a shroud 212 for mathematical analysis of its performance. The following are definitions of characters used in FIG. 4 and the equations below.

z = the axial coordinate measured from the base of the impeller cone.
$R_1$ = the radius of the impeller cone at z = 0.
$R_2$ = the radius of the shroud cone at z = 0.
$t_1$ = the half angle of the impeller cone.
$t_2$ = the half angle of the shroud cone.
$h_1(z)$ = the clearance between the shroud and groove.
$h_2(z)$ = the clearance between the shroud and the ridges of the impeller cone.

$h_{20} = h_2$ at $z = 0$.

$g_0$ = the depth of the grooves of the impeller cone at $z = 0$ (i.e.: $g_0 = h_1(0) - h_2(0)$).

$r_1(z)$ = the radius of the impeller cone at arbitrary z.

$r_2(z)$ = the radius of the shroud at arbitrary z.

$a_1(z)$ = the width of the grooves measured parallel to the circumference.

$a_2(z)$ = the width of the ridges measured parallel to the circumference.

$\alpha$ = the angle of the grooves and ridges measured from the circumferential plane.

N = the number of thread starts.

e = the axial distance between apex P of the impeller cone and apex Q of the shroud cone.

d = the diameter of the nozzle.

L = the engagement length of the nozzle.

$\hat{z}$ = the value of z at the truncated tip of the impeller cone.

$\epsilon$ = the fraction of the impeller cone which is truncated.

$H = h_2(z)/h_1(z)$; which is constant.

$\gamma = a_2(z)/a_1(z)$; which is also constant.

It may be shown that, for a Newtonian fluid, the total pressure rise $P_r$ in the pump and the total power W consumed by the pump are:

$$P_r = \eta(A\omega - B\dot{Q}) \tag{4a}$$

$$W = \eta\omega(C\omega - A\dot{Q}) \tag{4b}$$

where $\eta$ = Fluid viscosity $\omega$ = Angular velocity of impeller in radians/sec $\dot{Q}$ = Volumetric flow rate of fluid through pump And where A, B, C are functions of the pump geometry:

$$A \equiv \frac{6g_1(\alpha, H, \gamma)}{\cos t_1} I(-2, 1) \tag{4c}$$

$$B \equiv \frac{6(1 + \gamma)Hf_1(\alpha, H, \gamma)}{\pi \cos t_1} I(-3, -1) \tag{4d}$$

$$C \equiv \frac{2\pi g_2(\alpha, H, \gamma)}{(1 + \gamma)\cos t_1} \tag{4e}$$

In Eqs. (4), the functions $f_1$, $g_1$, and $g_2$ are $$f_1(\alpha, H, \gamma) = \frac{1}{\Delta} \{H^2(\gamma + H^3)(1 + \cot^2\alpha)\} \tag{5a}$$

$$g_1(\alpha, H, \gamma) = \frac{1}{\Delta} \{\gamma H^2(1 - H)(1 - H^3)\cot\alpha\} \tag{5b}$$

$$g_2(\alpha, H, \gamma) = (\gamma + H)\frac{1}{\Delta}\{3\gamma H(1 - H)^2(1 + \gamma H^3)\} \tag{5c}$$

where $$\Delta \equiv (1 + \gamma H^3)(\gamma + H^3) + H^3(1 + \gamma)^2\cot^2\alpha \tag{5d}$$

The functions I(m,r) in equations (4) are $$I(m, n) \equiv \int_0^{\hat{z}} h_2{}^m(z) r_1{}^n(z) dz \tag{6}$$

To work out these integrals, it is assumed that $h_2(z)$ and $r_1(z)$ are linear functions of z:

$$h_2(z) = h_{20} - \hat{\beta} z \tag{7a}$$

$$r_1(z) = R_1 - z \tan t_1 \tag{7b}$$

where $$\beta \equiv \cos t_2(\tan t_2 - \tan t_1) \tag{8}$$

Thus the integrands in eq. (6) are just products of powers of binomials which may be solved analytically by recursive integration by parts.

SPECIAL CASES: PARALLEL CONES AND COINCIDENT APEXES

Although the general solutions for the integrals are not given here, it is instructive to write the results explicitly for two special cases:

Special Case 1: $t_1 = t_2$ (parallel cones) \hfill (9a)

Special Case 2: $e = 0$ (cones with coincident apexes) \hfill (9b)

For this purpose it is convenient to define the fraction $\epsilon$ of the impeller cone which is truncated:

$$\epsilon = 1 - \frac{\hat{z}}{R_1}\tan t_1 \tag{10}$$

It is also convenient to note that when $t_1 = t_2$ (special case 1)

$$e = \frac{h_{20}}{\sin t_1} \text{ (special case 1 only)} \tag{11}$$

So if we define the normalized apex separation $$\hat{e} \equiv \frac{e}{h_{20}/\sin t_1} \tag{12}$$

then $\hat{e} = 1 \rightarrow$ parallel cones (special case 1) \hfill (13a)

$\hat{e} = 0 \rightarrow$ coincident apexes (special case 2) \hfill (13b)

We note that in terms of the shroud-to-ridge gap $h_2(z)$:

$\hat{e} = 1 \rightarrow$ constant gap, i.e., $h_2(z) = $ constant \hfill (13c)

$\hat{e} = 0 \rightarrow$ gap proportional to radius, i.e.: \hfill (13d)

$$h_2(z) = h_{20}\frac{r_1(z)}{R_1}$$

For parallel cones (e,cir/e/ = 1), it may be shown that the integrals I(m,n) required in eqs. (4) are:

$$I(-2, 1) = \frac{R_1{}^2 \cot t_1}{2h_{20}^2}(1 - \epsilon^2) \tag{14a}$$

$$I(-3, -1) = \frac{\cot t_1}{h_{20}^3} \ln\left(\frac{1}{\epsilon}\right) \tag{14b}$$

-continued $$I(-1, 3) = \frac{R_1^4 \cot t_1}{4h_{20}} (1 - \epsilon^4) \tag{14c}$$

Whereas for coincident apexes (e,cir/e/ =0):

$$I(-2, 1) = \frac{R_1^2}{h_{20}^2} \cot t_1 \ln\left(\frac{1}{\epsilon}\right) \tag{15a}$$

$$I(-3, -1) = \frac{\cot t_1}{3h_{20}^3} (\epsilon^{-3} - 1) \tag{15b}$$

$$I(-1, 3) = \frac{R_1^4 \cot t_1}{3h_{20}} (1 - \epsilon^3) \tag{15c}$$

RELATIONSHIP BETWEEN $\dot{Q}$ and $\omega$ VIA PRESSURE BALANCE

It is important to realize that the flow rate $\dot{Q}$ and rotational speed $\omega$ cannot be specified independently. They are connected by the requirement that the pressure rise in the pump be equal to the pressure drop in the nozzle (assuming that both the inlet and the exit of the pump are exposed to the same—e.g. atmospheric—pressure). Assuming Newtonian fluid and provided that the nozzle is not too short, the pressure drop $P_d$ in a nozzle of circular cross-section is given by the well-known Hagen-Poiseuille formula for pipe flow:

$$P_d = \eta \dot{Q} E \tag{16}$$

where $$E = \frac{128}{\pi} \frac{L}{d^4} \tag{17}$$

and d and L are defined above.

Thus, using eqs. (4a) and (16), and setting $$P_r = P_d \tag{18}$$

gives $$\omega = \frac{B+E}{A} \dot{Q} \tag{19}$$

which implies that if flow rate $\dot{Q}$ is specified, rotational speed $\omega$ is completely determined by pump and nozzle geometry. We note that for nozzle cross-sectional shapes other than circular, or for short nozzles where the assumption of fully developed flow is not valid over a significant fraction of the nozzle's length, modified versions of eqs. (16), (17), and (19) may be written.

PUMP PERFORMANCE AS A FUNCTION OF VARIOUS PARAMETERS

FIGS. 5a through 9b show typical, theoretical performance of the pump 211, including rotational speed RPM=$(\pi/30)\omega$ as a function of flow rate $\dot{Q}$, and the "input power" $W_m$ as a function of RPM. In these plots, various geometrical parameters were varied in pairs, as indicated in Table 1, about the following, nominal values:

$$H_{20}=0.002''g_0=0.005'' \tag{20a}$$

$$\alpha=26° \ \gamma=2.84 \tag{20b}$$

$$\hat{e}=1 \ \epsilon=0.32 \tag{20c}$$

$$d=0.016''L=0.016'' \tag{20d}$$

$$R_1=0.125''t_1=8° \tag{20e}$$

$$\eta=23Pa\text{-}s \tag{20f}$$

$$\dot{Q}=0.002 \text{ in}^3/\text{s} \tag{21}$$

TABLE 1

| FIG. | Parameter | Independent Variable |
|------|-----------|----------------------|
| 5    | $h_{20}$  | $g_0$                |
| 6    | $\alpha$  | $\gamma$             |
| 7    | $\hat{e}$ | $\epsilon$           |
| 8    | d         | L                    |
| 9    | $R_1$     | $t_1$                |

For each figure, as the pair of parameters is varied, other parameters were held fixed at the nominal values specified by eqs. (20) and (21).

Note that of the 7 geometrical variables ($R_1$, $R_2$, $t_1$, $t_2$, $h_{20}$, e, ê) only 4 are independent. So if ($h_{20}$, e,cir/e/ ,$R_1$, $t_1$,) are specified as in eqs. (20), e may be calculated immediately from eq. (12). Less obviously, $t_2$ may be calculated from $$h_{20}=(R_2-R_1) \cos t_2 \tag{22a}$$

and $$e=R_2 \cot t_2 - R_1 \cot t_1 \tag{22b}$$

which, upon elimination of $R_2$, may be manipulated to yield $$\sin t_2 = \frac{\lambda \mu}{\lambda^2 + 1} + \frac{1}{\lambda^2 + 1} \sqrt{\lambda^2 + 1 - \mu^2} \tag{23a}$$

where $$\lambda = \frac{e}{R_1} + \cot t_1; \ \mu = \frac{h_{20}}{R_1} \tag{23b}$$

Finally, $R_2$ may be calculated by substitution of the solution (23a) into (22a).

We also note that the "input power" plotted in FIGS. 5b, 6b, 7b, 8b and 9b is not W from eq. (4b), but rather the power $W_m$ which must be input to a motor of efficiency $\psi$ to drive the pump. Thus $$W_m = \frac{W}{\psi} \tag{24}$$

where we assumed $$\psi=0.101+0.0008566 \ \omega, \tag{25}$$

a function which was measured for a motor used experimentally.

THEORETICAL/EXPERIMENTAL COMPARISON

Figure 10A:
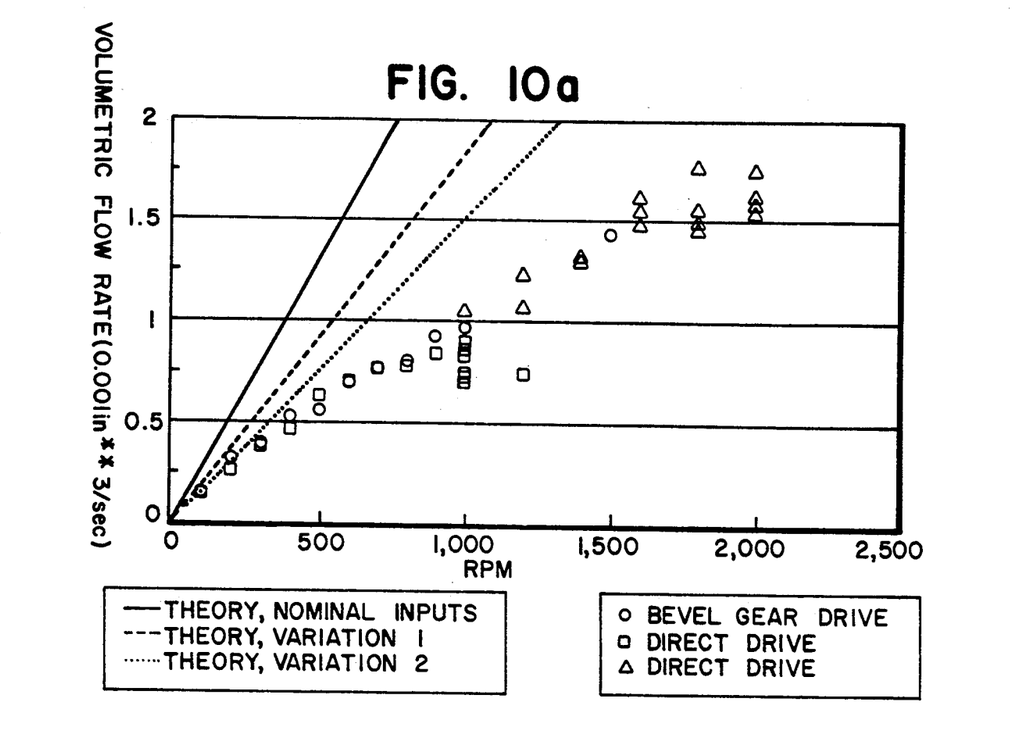
FIG. 10a is a graph of both theoretical and experimental data of volumetric flow rate vs. RPM.
Figure 10B:
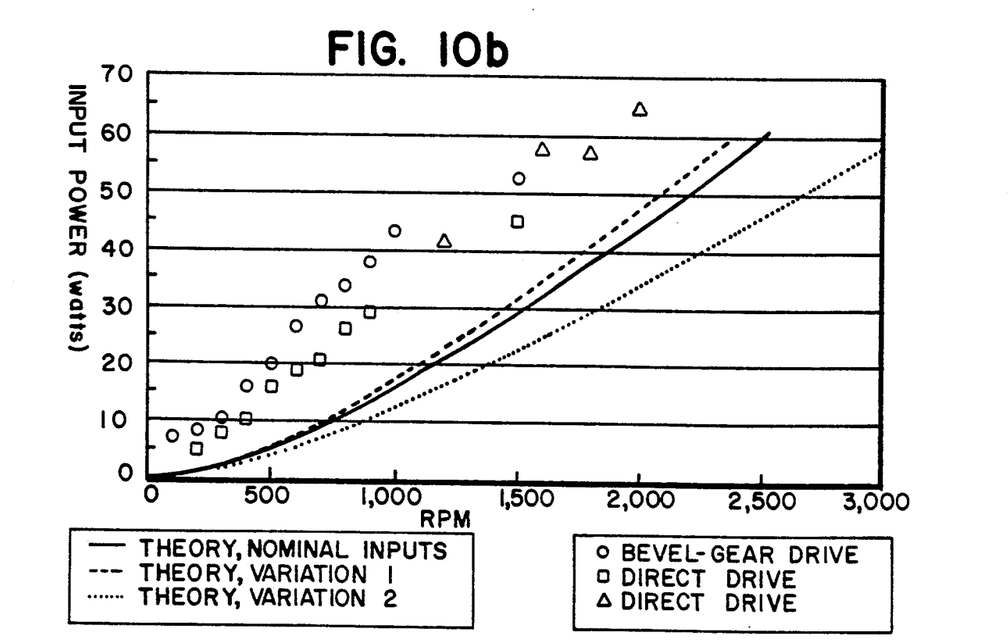
FIG. 10b is a graph of both theoretical and experimental data of input power vs. RPM.

FIGS. 10a and 10b shows a direct comparison between theory and experiment. Although the theory assumes Newtonian fluid in both the pump and the nozzle, the experimental data is for a non-Newtonian, polymeric fluid. On FIGS. 10a and 10b, the solid lines represent theoretical predictions for the nominal case, as given by eqs. (20) and (21), with variable flow rate $\dot{Q}$. The dashed and dotted lines are also theoretical predictions, but for perturbed values of certain geometrical parameters, as shown in Table 2. These variations of the nominal case were considered to simulate likely machining tolerances. Thus h·and $g_0$ were each perturbed 1 mil, while the perturbation of the parallelism parameter ê from 1 to 0.85 correspond to a perturbation of the shroud angle $t_2$ by 1.14 minutes of arc.

TABLE 2

| | Line Type on FIG. 10 | $h_{20}$ (Inches) | $g_0$ (Inches) | ê |
|---|---|---|---|---|
| Nominal Case | Solid | 0.002 | 0.005 | 1 |
| Variation 1 | Dashed | 0.002 | 0.004 | 0.85 |
| Variation 2 | Dotted | 0.003 | 0.004 | 0.85 |

As FIGS. 10a and 10b show, these machining tolerances can explain some but not all of the discrepancy between theory and experiment. The remaining discrepancy is most likely due to the fact, mentioned above, that the experiments were conducted using a non-Newtonian, polymeric fluid, in which the viscosity varies throughout the fluid as a function of the local shear rate, whereas the theory assumes Newtonian fluid in which the viscosity is constant and uniform throughout. Nevertheless, the theory serves as an invaluable aid for engineering design.

COMPARISON OF THE TWO SPECIAL CASES ê=1 AND ê=0

Among competing pump designs, the one which provides the required flow rate $\dot{Q}$ from a given nozzle at the lowest rotational speed $\omega$ is best, not only because the consumed power W is proportional to $\omega^2$ (see eqs. 4b and 19), but also because other factors, such as bearing life and undesirable non-Newtonian effects like rod climbing, worsen with higher speed. Thus, we define a figure of comparison F, to assess the relative merits of the two special cases ê=1 (parallel cones) and ê=0 (coincident apexes):

$$F = \frac{\omega(e=1)}{\omega(e=0)} \quad (26)$$

All parameters other than ê are assumed equal for purposes of this comparison. We note that $F<1$ implies that parallel cones (ê=1) are better (27a)

$F>1$ implies that coincident apexes (ê=0) are better (27b)

Substituting eq. (19) into (26) and rearranging yields $$F = \frac{\left\{\left(\frac{B}{A}\right)_{e=1}\right\}\left\{1+\left(\frac{E}{B}\right)_{e=1}\right\}}{\left(\frac{B}{A}\right)_{e=0}\;\;1+\left(\frac{E}{B}\right)_{e=0}} \quad (28)$$

If we abbreviate $$f_1(\alpha, H, \gamma) \equiv f_1; g_1(\alpha, H, \gamma) \equiv g_1 \quad (29)$$

Then according to eqs. (4) and (17), we have in general $$\frac{B}{A} = \frac{(1+\gamma)Hf_1}{\pi g_1} \cdot \frac{I(-3,-1)}{I(-2,1)} \quad (30a)$$

$$\frac{E}{B} = \frac{64 L \cos t_1}{3d^4(1+\gamma)Hf_1 I(-3,-1)} \quad (30b)$$

Substituting eqs. (16) for the integrals I(m,n) gives, for ê=1.

$$\left(\frac{B}{A}\right)_{e=1} = \frac{2(1+\gamma)Hf_1}{\pi g_1 R_1^2 h_{20}} \cdot \frac{\ln\left(\frac{1}{\epsilon}\right)}{1-\epsilon^2} \quad (31a)$$

$$\left(\frac{E}{B}\right)_{e=1} = \frac{T}{\ln\left(\frac{1}{\epsilon}\right)} \quad (31b)$$

where $$T = \frac{64 L h_{20}^3 \sin t_1}{3d^4(1+\gamma)Hf_1} \quad (32)$$

Likewise substituting eqs (15) into eqs. (30) gives, for ê=0:

$$\left(\frac{B}{A}\right)_{e=0} = \frac{(1+\gamma)Hf_1}{3\pi g_1 R_1^2 h_{20}} \cdot \frac{1-\epsilon^3}{\epsilon^3 \ln\left(\frac{1}{\epsilon}\right)} \quad (33a)$$

$$\left(\frac{E}{B}\right)_{e=0} = \frac{3\epsilon^3 T}{1-\epsilon^3} \quad (33b)$$

Thus, substituting eqs. (31) and (33) into (28), the figure of comparison F is $$F(T, \epsilon) = \frac{6\epsilon^3 \left[\ln\left(\frac{1}{\epsilon}\right)\right]^2}{(1-\epsilon^2)(1-\epsilon^3)} \cdot \frac{1+\frac{T}{\ln\left(\frac{1}{\epsilon}\right)}}{1+\frac{3\epsilon^3 T}{1-\epsilon^3}} \quad (34)$$

In other words, the relative merits of parallel cones (ê=1) vs. coincident-apex cones (ê=0) are discernable from just two parameters, $\epsilon$ and T. This helps greatly in selecting a design with a minimum amount of numerical trial and error. The function F is plotted vs. T, with $\epsilon$ as parameter, in FIG. 11a.

It is useful to divide the $(T,\epsilon)$ space explicitly into two regions; one where $\hat{e}=1$ is better ($F<1$), and the other where $\hat{e}=0$ is better ($F>1$). For this purpose we need to find the boundary locus $F=1$. Define $$a(\epsilon) = \frac{6\epsilon^3 \left[\ln\left(\frac{1}{\epsilon}\right)\right]^2}{(1-\epsilon^2)(1-\epsilon^3)} \tag{35a}$$

$$b(\epsilon) = \frac{1}{\ln\left(\frac{1}{\epsilon}\right)} \tag{35b}$$

$$c(\epsilon) = \frac{3\epsilon^3}{1-\epsilon^3} \tag{35c}$$

Then eq. (34) may be written $$F(T,\epsilon) = a(\epsilon)\frac{1+b(\epsilon)T}{1+c(\epsilon)T} \tag{36}$$

Figure 11A:
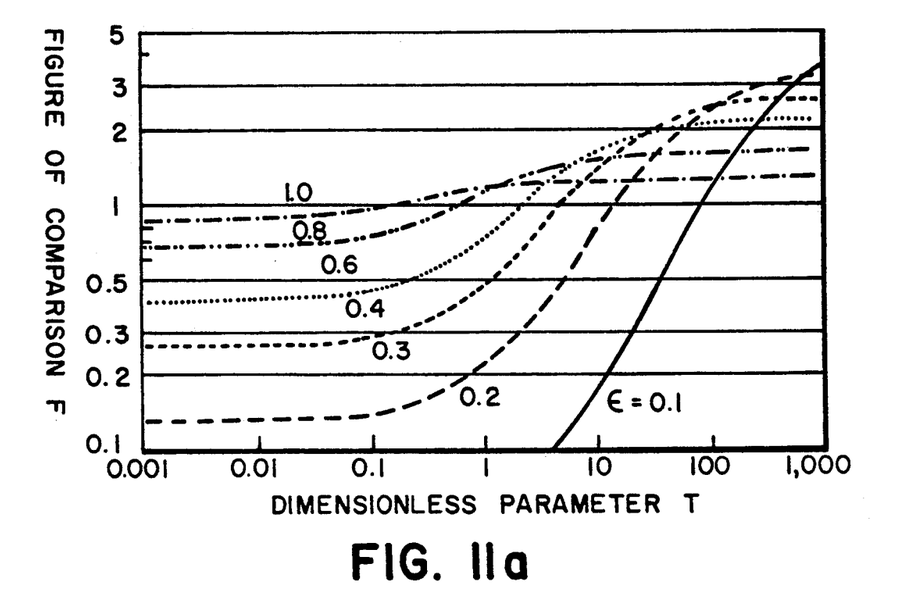
FIG. 11a is a graph of the figure of comparison F vs. dimensionless parameter T with the truncation fraction $\epsilon$ as parameter.
Figure 11B:
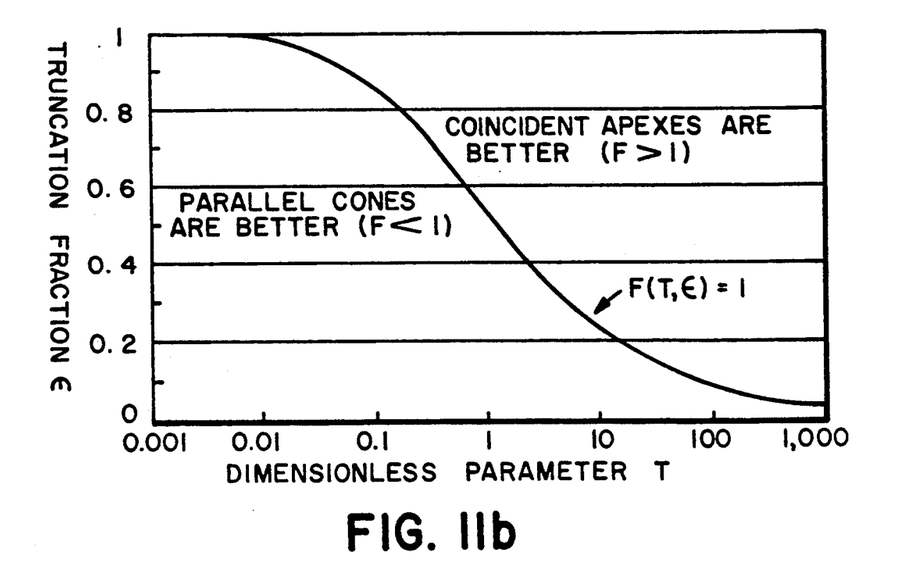
FIG. 11b is a graph of the locus of $F(T,\epsilon)=1$ in the $(T,\epsilon)$ plane.

Thus the locus $F(T,\epsilon)=1$ is given by $$T = \frac{1-a(\epsilon)}{a(\epsilon)b(\epsilon)-c(\epsilon)} \tag{37}$$

which is plotted in FIG. 11b.

As an example of usefulness of FIGS. 11a and 11b, consider the nominal case described by eqs. 20 and 21 above. We find $T=0.057$ for which FIG. 11 predicts that if $\hat{e}$ and $\epsilon$ are allowed to vary, $\hat{e}=1$ should be better than $\hat{e}=0$ (i.e. should require a lower value of $\omega$ to produce a given flow rate) for all values of $\epsilon<0.9$. This prediction is verified by FIG. 7a. For $\epsilon<0.9$, the RPM curve for $\hat{e}=1$ lies below the $\hat{e}=0$ curve for all $\epsilon<0.9$, and the two curves coalesce indistinguishably for $0.9<\epsilon<1.0$.

Figure 7A:
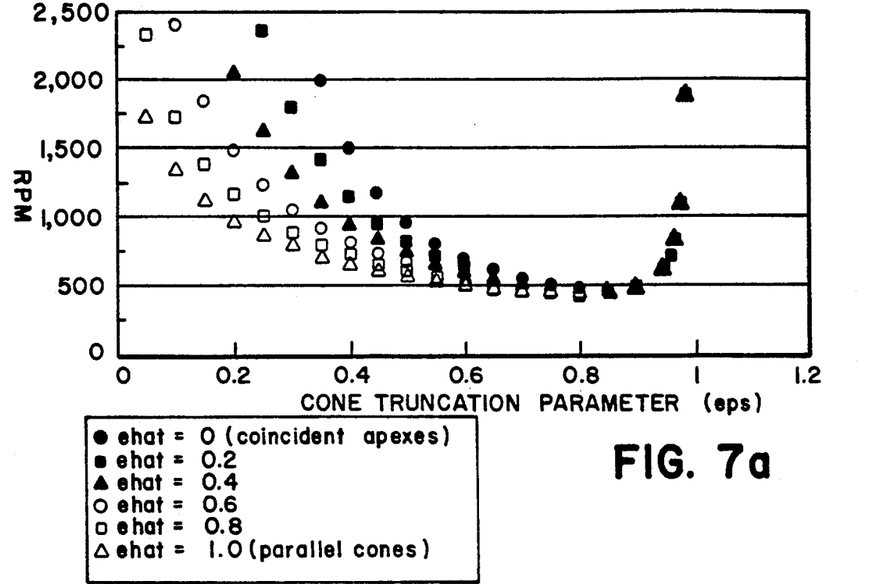
FIG. 7a is a graph of theoretical results for RPM vs. cone truncation and cone parallelism with other geometry and flow parameters fixed.
Figure 7B:
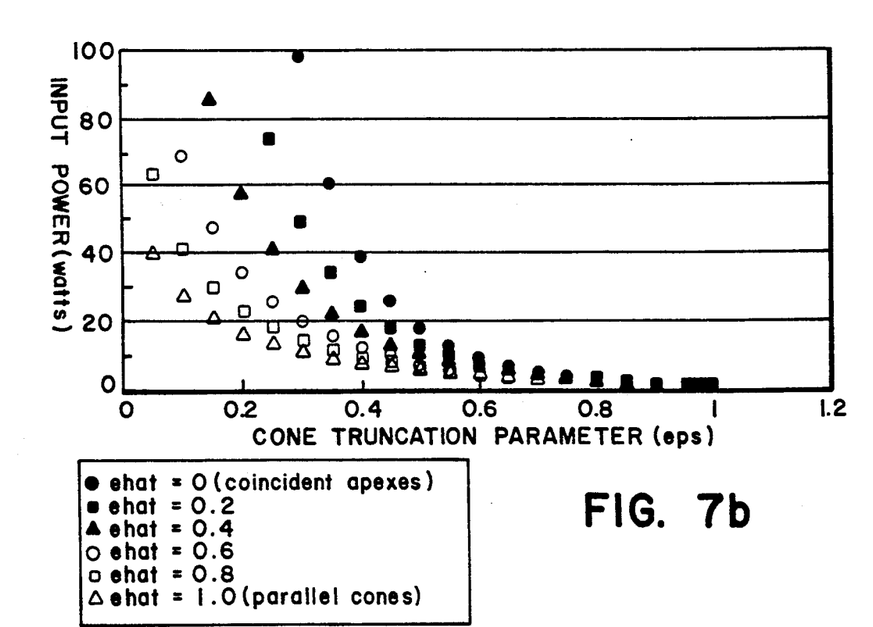
FIG. 7b is a graph of theoretical results for input power vs. cone truncation and cone parallelism with other geometry and flow parameters fixed.
Figure 8A:
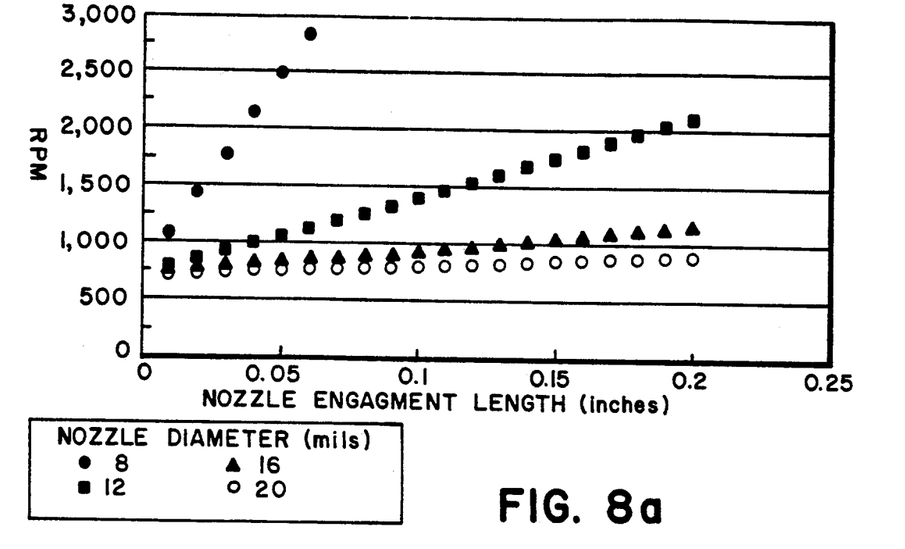
FIG. 8a is a graph of theoretical results for RPM vs. nozzle diameter and engagement length with other geometry and flow parameters fixed.
Figure 8B:
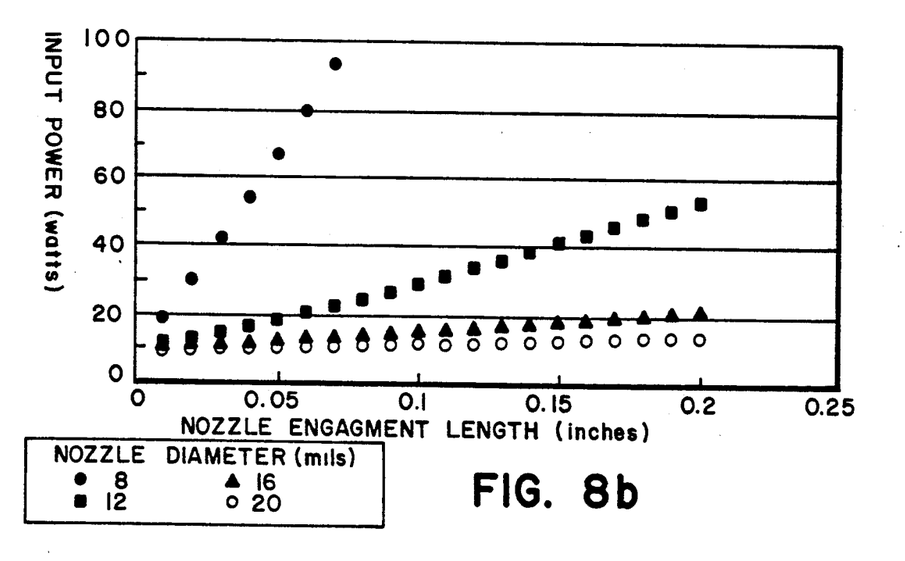
FIG. 8b is a graph of theoretical results for input power vs. nozzle diameter and engagement length with other geometry and flow parameters fixed.
Figure 9A:
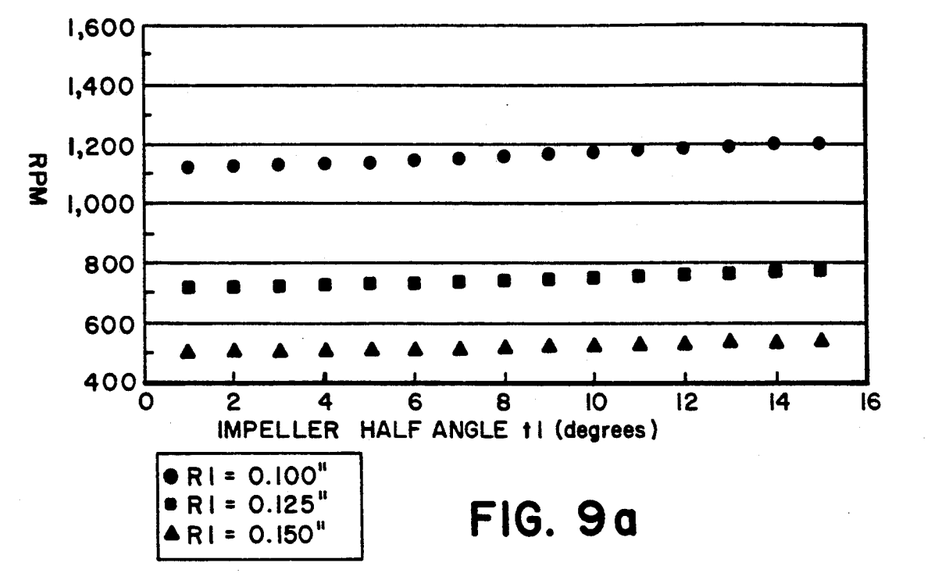
FIG. 9a is a graph of theoretical results for RPM vs. impeller half-angle and major radius with other geometry and flow parameters fixed.
Figure 9B:
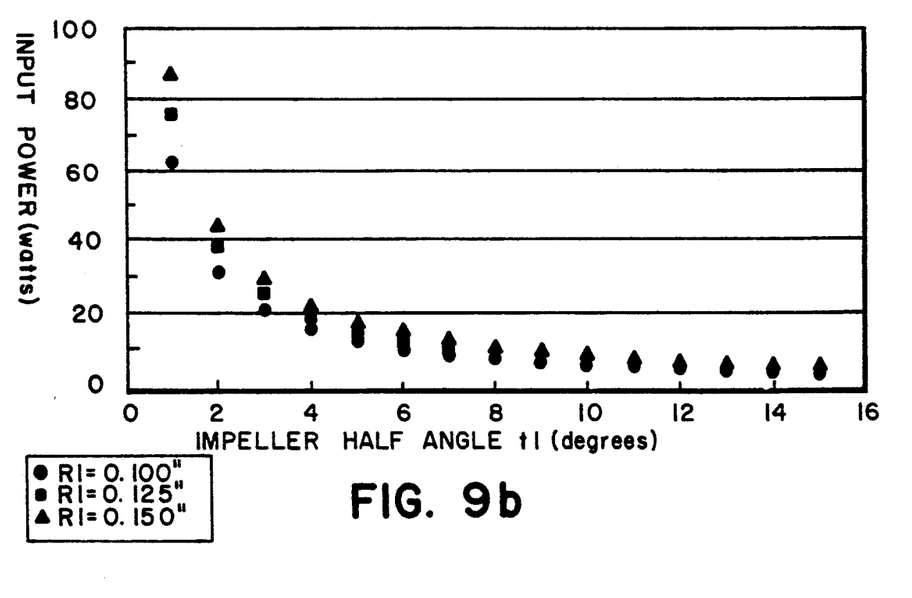
FIG. 9b is a graph of theoretical results for input power vs. impeller half-angle and major radius with other geometry and flow parameters fixed.

More specifically and quantitatively, FIG. 11a says, for example, that $$F(0.057, 0.35) \approx 0.35,$$

i.e., $\hat{e}=1$ should yield a rotational speed which is 35% of that for $\hat{e}=0$. Indeed at $\epsilon=0.35$ in FIG. 7a, the RPM for $\hat{e}32\ 1$ is about 700; that for $\hat{e}=0$ is about 2000.

FIG. 11b provides a quick way of assessing the effect of design changes. Suppose for example that the nominal case (eqs. 20 and 21) is altered by changing the nozzle diameter d. According to Eq. (32), each halving of the nozzle diameter multiplies T by 16. Thus, $T=0.057$ for $d=0.016''$ (nominal case)

$T=0.912$ for $d=0.008''$ $T=14.59$ for $d=0.004''$

Using FIG. 11b, we can say immediately that for $d=0.016''$, parallel cones are better for all $\epsilon<0.9$; for $d=0.008''$, parallel cones are better for all $\epsilon<0.55$; for $d=0.004''$, parallel cones are better for all $\epsilon<0.20$.

Based upon measurements from several experimental test pumps discharging hot melt adhesive and the above-identified theoretical analysis, there are several recommendations for geometric optimization of a conical logarithmic spiral viscosity pump. Having the female shroud parallel to the impeller surface is generally preferred for cases where higher flow at lower pressure are required (e.g. large nozzles). Having the gap between the shroud and the impeller shrink towards the small end of the impeller is generally preferred for cases where higher pressures at lower flow are required (e.g. small nozzles). The preferred range for truncation of the cone is between 15% and 95% removed; the design point moves from 15% towards 95% as lower pressures and higher flows are required. The preferred cone angles are between 2 and 60 degrees. The preferred ridge width to groove width ratio (gamma) is between 0.05 and 1. The preferred tilt angle of the grooves (alpha) is between 5 and 50 degrees. The data from several experimentally tested pumps shows that the agreement between theory and experiment is reasonable; the agreement improves at lower shear rates, which suggests that the non-Newtonian properties of the adhesive cause some of the discrepancy.

The conical logarithmic spiral viscosity pump design is well suited for pumping applications where small size, high pressure, valveless, and gasketless operation are important. Examples include:

pumping grease or other lubricants through a mechanical system;

injection molding;

high temperature pumping of plastics, tars, and waxes;

liquid chromatography analysis;

hydraulic power conversion;

deposition of molten metal alloys and composites.

In addition to the properties that the pump can generate high pressure at high temperature, the design also has very low pressure fluctuation (unlike gearpumps). It can change pressure very quickly, allowing the flow rate to track with other variable such as the velocity of an extruding nozzle. The mass is low enough (due to the small size) that the pump itself can be mounted at the depositing nozzle of a robotic system. These elements suggest the use of this design for:

applying adhesive beads to car panels;

applying sealing compound to windows prior to mounting in frames or assemblies;

applying mastic to cardboard boxes prior to assembly;

extruding settable material in a sequence of trajectories in space to build up a solid object (e.g. rapid prototyping);

assembly of furniture with hot melt adhesive;

selectively depositing screenable material on circuit boards;

applying decorative patterns to food products (e.g. cake icing).

Figure 12:
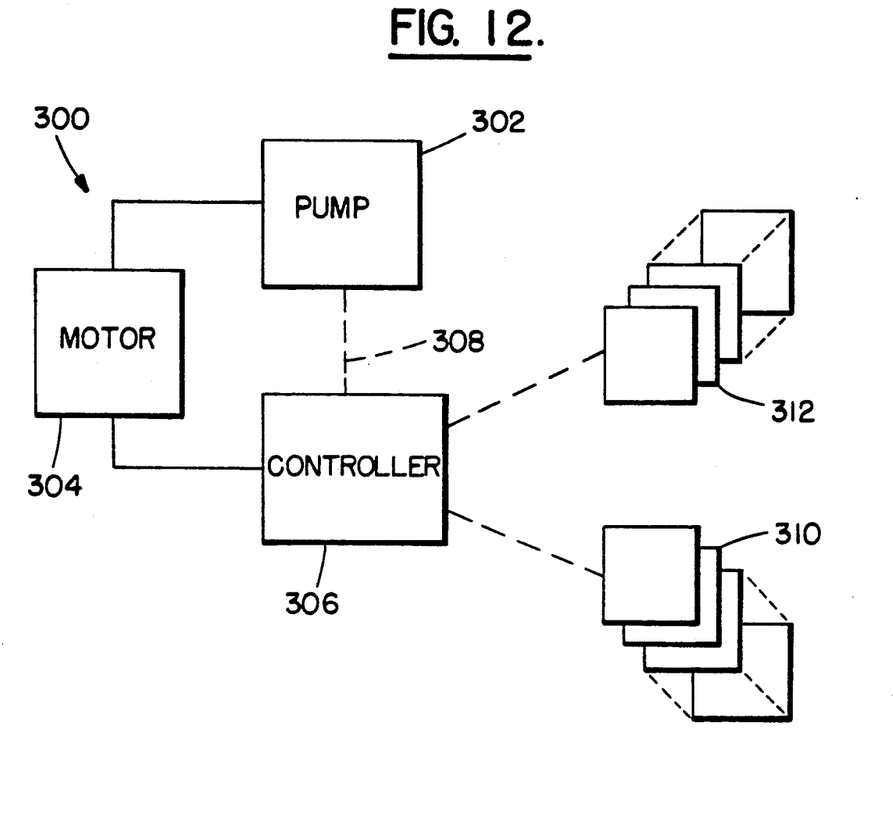
FIG. 12 is a schematic diagram of a system incorporating features of the present invention.

FIG. 12 shows a schematic diagram of a system incorporating features of the present invention. The system 300 generally comprises a conical logarithmic spiral viscosity pump 302 as described above, a motor 304, and a controller 306. The controller is preferably a computer with a microprocessor and memory. However, any suitable type of controller could be provided. The controller 306 is connected to the motor 304. The motor 304 is connected to the pump 302. Because the motor 304 controls the rotation of the pump's impeller, the controller 306 can control the motor 304 (such as ON, OFF, and speed) to control discharge of material from the pump's nozzle. In an alternate embodiment, the controller 306 could be directly connected to the pump 302 as indicated by line 308 to directly control various features of the pump 302, such as an electromagnetic closure gate at the pump's nozzle or an internal motor in the pump 302. The system 300 can also include various input devices 310 and output devices 312 that can be connected to the controller 306. The input devices can include reading devices, such as a floppy disk drive, electromagnetic tape drive, CD drive, etc., a keyboard, a mouse, an input plotter, a visual imaging system, etc. The output devices can include a monitor, a pump location positioner, a platform or article positioner, etc. U.S patent application Ser. No. 07/637,570 filed Jan. 3, 1991 entitled "Model Generation System Having Closed-Loop Extrusion Nozzle Positioning" assigned to the same assignee as herein discloses a system and method that features of the present invention can be incorporated into. The full disclosure of this U.S. patent application is hereby incorporated by reference. U.S. patent application Ser. No. 08/004,038 filed Jan. 15, 1993 entitled "Method And Apparatus Employing Sequential Two-Dimensional Geometry For Producing Shells For Fabrication By A Rapid Prototyping System" assigned to the same assignee as herein is also hereby incorporated by reference in its entirety.

It should be understood that the foregoing description is only illustrative of the invention. Various alternatives and modifications can be devised by those skilled in the art without departing from the spirit of the invention. Accordingly, the present invention is intended to embrace all such alternatives, modifications and variances which fall within the scope of the appended claims.

What is claimed is:

1. A viscosity pump comprising:
 a housing having a pump chamber and an outlet, the chamber having a section with a general conical shape, the outlet being located at a narrow end of the section; and
 an impeller rotatably located in the chamber, the impeller having a generally conical section with at least one logarithmic spiral groove along an exterior of the conical section.

2. A pump as in claim 1 wherein the impeller has a front located at the outlet which is substantially smooth shaped with the groove not extending to the front.

3. A pump as in claim 1 wherein the impeller is spaced from the housing along the generally conical section with a substantially constant gap.

4. A pump as in claim 1 wherein the impeller is spaced from the housing along the generally conical section with a gap that varies along the length of the generally conical section.

5. A pump as in claim 4 wherein the groove has a depth that varies along the length of the generally conical section.

6. A pump as in claim 5 wherein the groove depth decreases along the length of the generally conical section.

7. A pump as in claim 4 wherein the gap decreases along the length of the generally conical section.

8. A rotary fluid pump comprising:
 a pump housing having an inlet, an outlet, and an impeller chamber therebetween, the impeller chamber including a narrowing section with a narrow end located proximate the outlet; and
 an impeller rotatably mounted in the impeller chamber, the impeller having a portion located in and substantially similarly shaped to the narrowing section except including a groove along its exterior having an approximate logarithmic spiral, the impeller having ridges along its exterior with a substantially constant gap between the ridges and the housing.

9. A pump as in claim 8 wherein the narrowing section of the chamber has a general conical shape.

10. A pump as in claim 9 wherein the impeller has a general conical shape.

11. A pump as in claim 10 wherein the impeller has a front with a cone shape without the groove.

12. A pump as in claim 8 wherein the groove has a substantially constant depth along the length of the impeller portion.

13. A rotary fluid pump comprising:
 a pump housing have an inlet, an outlet, and an impeller chamber therebetween, the impeller chamber including a narrowing section with a narrow end located proximate the outlet; and
 an impeller rotatably mounted in the impeller chamber, the impeller having a portion located in and substantially similarly shaped to the narrowing section except including a groove along its exterior having an approximate logarithmic spiral, the impeller having ridges along its exterior with a gap that varies between the ridges and the housing along the length of the impeller.

14. A pump as in claim 13 wherein the groove has a depth that varies along the length of the impeller.

15. A pump as in claim 14 wherein the groove becomes shallower along the length of the impeller.

16. A method of manufacturing a viscosity pump comprising steps of:
 providing a housing having a pump chamber and an outlet, the chamber having a section with a general conical shape, the outlet being located at a narrow end of the section;
 inserting a impeller into the pump chamber, the impeller having a general conical section with at least one logarithmic spiral groove along an exterior of the impeller conical section, spacings between the impeller and housing decreasing along the length of the impeller to produce a fluid pressure (P) of $$P = \frac{-6\eta\omega R_1^2 \ln(\epsilon) g_1}{h_{20}^2 \sin(t_1)} - \frac{2(1+\gamma)\eta Q((1/\epsilon^3)-1) H f_1}{\pi h_{20}^3 \sin(t_1)}.$$

17. A system for dispensing a fluid comprising:
 a controller; and
 a conical logarithmic spiral viscosity pump connected to the controller.

18. A system as in claim 17 further comprising a motor connected between the controller and the pump.

19. A system as in claim 17 further comprising a pump location positioner connected to the controller and pump that is adapted to move the pump to desired locations.

20. A pumping assembly comprising:
 a conical logarithmic spiral viscosity pump; and
 a drive motor connected to an impeller of the pump, the motor being adapted to axially rotate the impeller relative to a housing of the pump.

* * * * *